US010532784B2

United States Patent
Ishitsuka et al.

(10) Patent No.: US 10,532,784 B2
(45) Date of Patent: Jan. 14, 2020

(54) VEHICLE BODY ASSEMBLING METHOD AND VEHICLE BODY ASSEMBLING APPARATUS

(71) Applicant: HONDA MOTOR CO., LTD., Minato-ku, Tokyo (JP)

(72) Inventors: Hisashi Ishitsuka, Tochigi-ken (JP); Hiroyuki Takahashi, Tochigi-ken (JP)

(73) Assignee: HONDA MOTOR CO., LTD., Tokyo (JP)

(*) Notice: Subject to any disclaimer, the term of this patent is extended or adjusted under 35 U.S.C. 154(b) by 128 days.

(21) Appl. No.: 15/578,286

(22) PCT Filed: Jun. 3, 2016

(86) PCT No.: PCT/JP2016/066594
§ 371 (c)(1),
(2) Date: Nov. 30, 2017

(87) PCT Pub. No.: WO2016/195075
PCT Pub. Date: Dec. 8, 2016

(65) Prior Publication Data
US 2018/0141600 A1 May 24, 2018

(30) Foreign Application Priority Data
Jun. 4, 2015 (JP) .................. 2015-113863

(51) Int. Cl.
*B62D 65/02* (2006.01)
*B23K 11/31* (2006.01)
(Continued)

(52) U.S. Cl.
CPC .......... *B62D 65/026* (2013.01); *B23K 11/314* (2013.01); *B62D 25/085* (2013.01);
(Continued)

(58) Field of Classification Search
CPC .............. B62D 25/2018; B62D 25/085; Y10T 29/53539; Y10T 29/53548;
(Continued)

(56) References Cited

U.S. PATENT DOCUMENTS 4,290,203 A * 9/1981 Rebman ................ B23P 19/102
33/644
4,667,866 A * 5/1987 Tobita .................. B23K 37/047
219/79
(Continued)

FOREIGN PATENT DOCUMENTS

| JP | 2000190136 A | * | 7/2000 |
| JP | 3661463 | | 6/2005 |
| JP | 2013-159125 | | 8/2013 |

OTHER PUBLICATIONS

English translation JP2013159125 Liang (Year: 2013).*
(Continued)

*Primary Examiner* — Jason L Vaughan
*Assistant Examiner* — Amanda Kreiling
(74) *Attorney, Agent, or Firm* — Amin, Turocy & Watson, LLP

(57) ABSTRACT

Provided are a vehicle body assembling method and a vehicle body assembling apparatus which allow a simple configuration in the vicinity of the connecting portion between an upper jig and a lower jig and allow an increase in the efficiency of assembling work (welding work). A vehicle body assembling apparatus is equipped with a jig for supporting vehicle body components in a preassembled position, the jig comprising an upper jig and a lower jig which are connected to each other in at least two places. Each of the connection places is provided with a connecting means for fixing a three-dimensional coordinate position while allowing uniaxial turning. The vehicle body assembling apparatus is also equipped with a conveying means for conveying the upper jig which supports the vehicle body components, and reduces the load applied to the lower jig from the upper jig when connecting the upper jig to the lower jig.

8 Claims, 5 Drawing Sheets

(51) Int. Cl.
  *B62D 25/08* (2006.01)
  *B62D 25/20* (2006.01)
  *B23K 101/00* (2006.01)
  *B23K 37/04* (2006.01)
  *B23K 37/047* (2006.01)

(52) U.S. Cl.
  CPC ........ *B62D 25/2018* (2013.01); *B23K 37/047* (2013.01); *B23K 37/0443* (2013.01); *B23K 2101/006* (2018.08)

(58) Field of Classification Search
  CPC ......... Y10T 29/49826; Y10T 29/49828; Y10T 29/49829; Y10T 29/49831
  See application file for complete search history.

(56) References Cited

U.S. PATENT DOCUMENTS

| | | | | |
|---|---|---|---|---|
| 6,008,471 | A * | 12/1999 | Alborante | B62D 65/02 219/158 |
| 6,193,142 | B1 * | 2/2001 | Segawa | B23K 37/047 219/148 |
| 6,609,941 | B1 * | 8/2003 | Onuki | G01M 11/061 29/700 |

OTHER PUBLICATIONS

English Translation JP2000190136 Isobe (Year: 2000).*
International Search Report for International Application No. PCT/JP2016/066594 dated Jul. 12, 2016, 6 pages.
Written Opinion for International Application No. PCT/JP2016/066594 dated Jul. 12, 2016, 3 pages.

* cited by examiner

VEHICLE BODY ASSEMBLING METHOD AND VEHICLE BODY ASSEMBLING APPARATUS

TECHNICAL FIELD

The present invention relates to a vehicle body assembling method and a vehicle body assembling device (apparatus).

BACKGROUND ART

Conventionally, techniques of welding a plurality of components of a vehicle body to assemble the vehicle body are disclosed in, for example, Japanese Laid-Open Patent Publication No. 2013-159125 and Japanese Patent No. 3661463. In these techniques, the components are welded in a state where an upper jig and a lower jig support the components of the vehicle body.

SUMMARY OF INVENTION

In the vehicle body assembling technique disclosed in Japanese Laid-Open Patent Publication No. 2013-159125, a lower side jig and an upper side jig are fit to each other and positioned, so that a plurality of components of a vehicle body structure are welded in a state where clamp mechanisms included in the lower side jig and the upper side jig respectively constrain a lower portion and an upper portion of the vehicle body structure.

In the vehicle body assembling technique disclosed in Japanese Patent No. 3661463, a workpiece is positioned from inside by using a reference post of a lower jig. Consequently, it is easy to set the workpiece, and obstacles that prevent entry of a welding gun decrease. The reference post of this lower jig fits to a reference post of an upper jig.

In these vehicle body assembling techniques, a workpiece (vehicle body structure) is positioned based on the fitting between the upper jig (upper side jig) and the lower jig (lower side jig). Therefore, it is necessary to enhance strength of the reference post and the clamp mechanism enough to support the weights of the upper jig and the workpiece. Therefore, it is concerned that the reference post or the clamp mechanism becomes large and is readily interfered with a welding device, lowering efficiency of welding operation.

The present invention has been made in light of such a problem. An object of the present invention is to provide a vehicle body assembling method and a vehicle body assembling device that can simplify a configuration relating to the coupling between an upper jig and a lower jig and improve efficiency of an assembling operation (welding operation).

A vehicle body assembling method according to the present invention is to support vehicle body components in advance in an assembled state using an upper jig and a lower jig coupled to each other, and includes: conveying the upper jig by a conveying means in a state where the upper jig supports the vehicle body component; and coupling the upper jig to the lower jig at least two portions in a state where a load applied from the upper jig to the lower jig is reduced, such that uniaxial rotation is allowed while a three-dimensional coordinate position is fixed at each of the at least two portions of coupling.

According to the vehicle body assembling method, the upper jig is coupled to lower jig in a state where the load applied from the upper jig to the lower jig is reduced. Consequently, it is possible to simplify a configuration relating to the coupling between the upper jig and the lower jig. It is possible to reduce the number of coupling portions of the upper jig and the lower jig. Consequently, it is possible to improve efficiency of an assembling operation (welding operation).

The above vehicle body assembling method preferably includes detecting seating of the upper jig to the lower jig. Consequently, it is easy to perform control of reducing the load applied from the upper jig to the lower jig.

It is preferable to detect an amount of a load applied to the conveying means from the upper jig. Consequently, it is easy to control the load applied from the upper jig to the lower jig to a predetermined value.

The two coupling portions between the upper jig and the lower jig are preferably at an inside and an outside of the vehicle body component seen from above. Consequently, it is possible to efficiently position the upper jig with respect to the lower jig.

The vehicle body assembling device according to the present invention includes a jig configured to support a vehicle body component in advance in an assembled state, the jig includes an upper jig and a lower jig coupled to each other via at least two portions; a coupling unit is provided at each coupling portion, such that uniaxial rotation is allowed and a three-dimensional coordinate position is fixed; and the vehicle body assembling device further includes a conveying unit configured to convey the upper jig supporting the vehicle body component, and reduce a load applied from the upper jig to the lower jig when the upper jig is coupled to the lower jig.

According to the above vehicle body assembling device, the upper jig is coupled to the lower jig in the state where the load applied from the upper jig to the lower jig is reduced. Consequently, it is possible to simplify the configuration relating to the coupling unit. Further, it is possible to reduce the number of coupling portions of the upper jig and the lower jig, improving efficiency of the assembling operation (welding operation).

According to the vehicle body assembling method and the vehicle body assembling device according to the present invention, the lower jig received the weights of the upper jig and the vehicle body component in a reduced manner. Consequently, it is possible to reduce the size of the configuration relating to the coupling between the upper jig and the lower jig. Further, since the number of coupling portions of the upper jig and the lower jig can be reduced, efficiency of an assembling operation (welding operation) is enhanced.

BRIEF DESCRIPTION OF DRAWINGS

FIG. 2 is seen from above;

DESCRIPTION OF EMBODIMENTS

A preferred embodiment of a vehicle body assembling device according to the present invention will be described below with reference to the accompanying drawings. A vehicle body assembling device 10 according to the present embodiment includes an upper jig 12, a lower jig 14 and a conveying robot (conveying unit) 16. A case where a front assembly (vehicle body component) 18 of a vehicle body is assembled will be described below as an example. However, the type of the vehicle component is not limited thereto.

Figure 1:
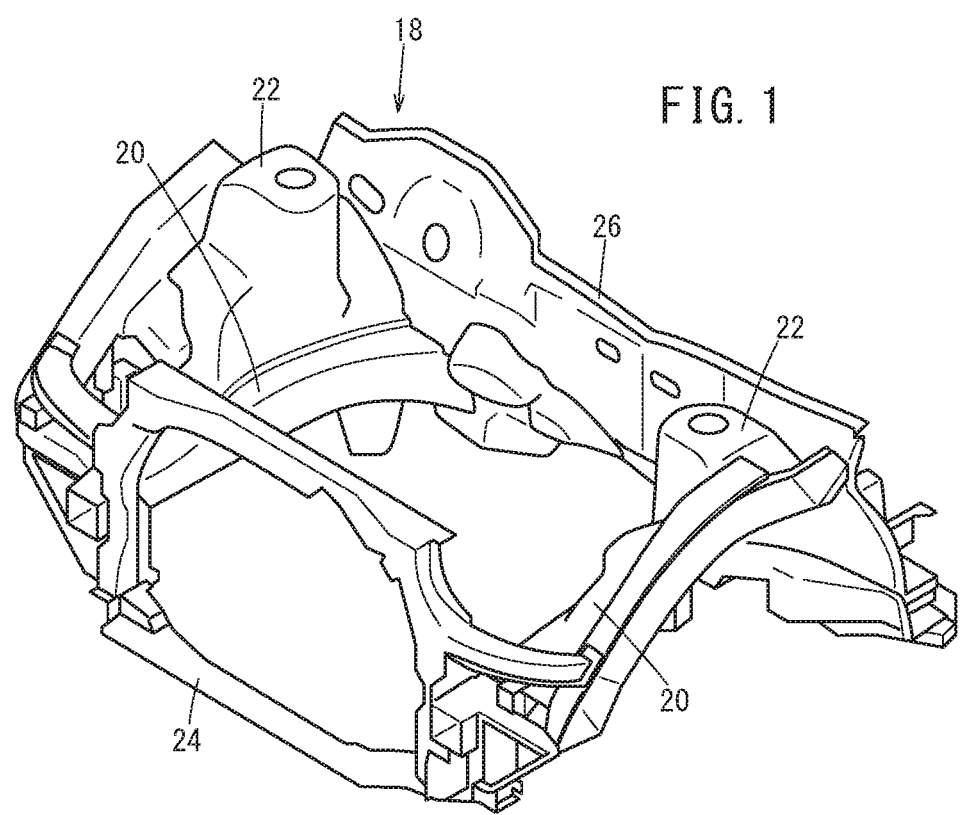
FIG. 1 is a perspective view of a front assembly.

As shown in FIG. 1, the front assembly 18 includes a pair of front side frames 20, a pair of front wheel houses 22, a front bulk head 24 and a dashboard 26. The front side frames 20 are disposed at sides of an engine, and the front wheel houses 22 are disposed above the front side frames 20. The front bulk head 24 is disposed at the front of the engine, and the dashboard 26 is disposed at the back of the engine. Pin holes (not shown) in which positioning pins 28 described below are inserted are formed at predetermined portions of these components that form the front assembly 18.

Figure 2:
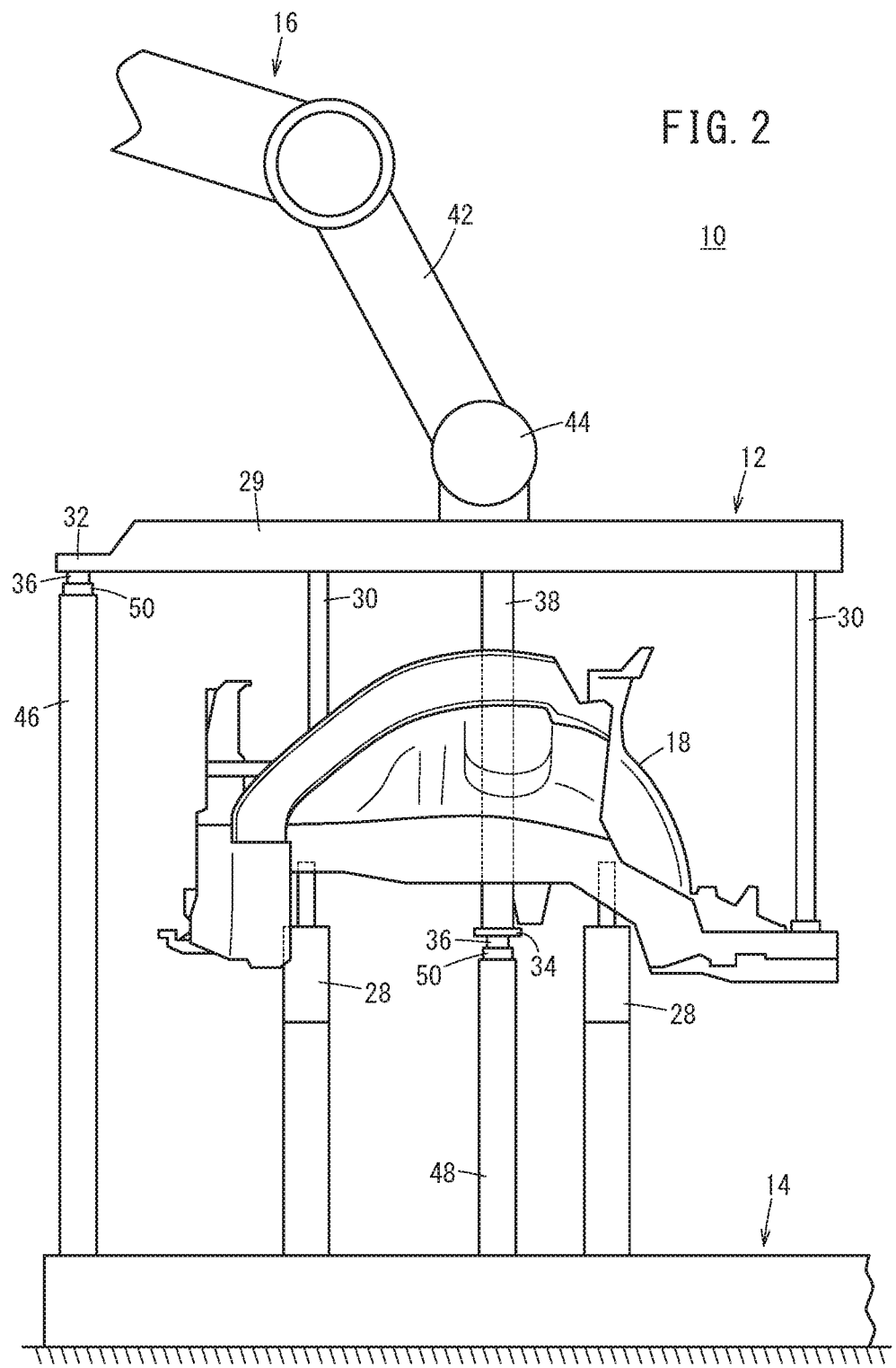
FIG. 2 is a view showing a state where an upper jig is coupled to a lower jig in a vehicle body assembling device (method) according to an embodiment of the present invention.

As shown in FIG. 2, the upper jig 12 includes a base portion 29. A plurality of grip portions 30 for gripping the front assembly 18 protrude from a lower surface of the base portion 29. A first coupling plate 32 provided at an end portion of the base portion 29 can be coupled to the lower jig 14. A support post 38 protrudes downward from a portion closer to the center of the base portion 29, and a second coupling plate 34 is provided to be coupled to the lower jig 14 via the support post 38. The first coupling plate 32 and the second coupling plate 34 include at their lower surfaces guide blocks 36 to be described below.

The conveying robot 16 includes a link mechanism that can perform a bending operation. A distal end arm 42 of the link mechanism is rotatably coupled to an upper surface of the base portion 29 of the upper jig 12 via a joint portion 44. The joint portion 44 includes a sensor (not shown) that detects a load applied to the distal end arm 42 from the upper jig 12. A detection signal of the sensor is inputted to a control device that activates the conveying robot 16. The conveying robot 16 is free to make reciprocating movement between an unillustrated set station and an installation site of the lower jig 14.

Figure 3:
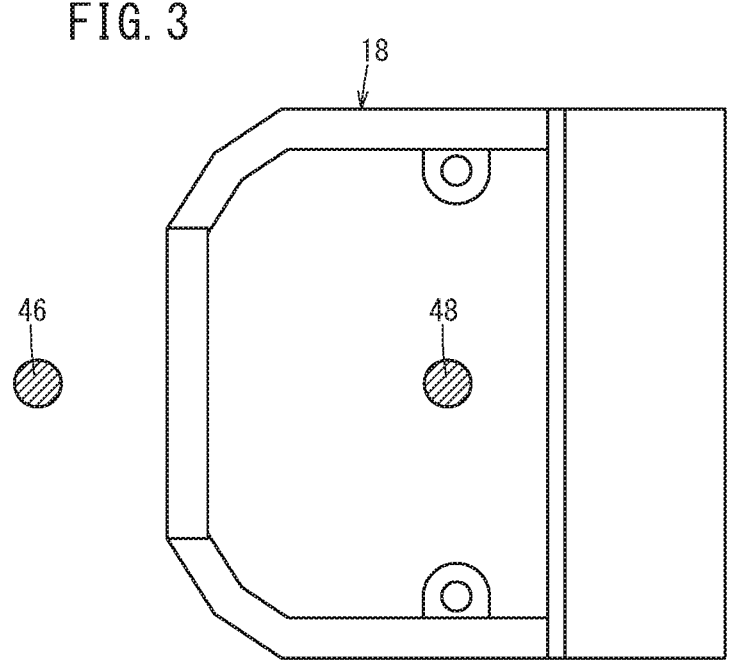
FIG. 3 is a conceptual diagram showing a positional relationship between the front assembly and coupling posts when

The lower jig 14 is installed on and fixed to a floor surface, and includes a first coupling post 46 and a second coupling post 48 that can respectively be coupled to the first coupling plate 32 and the second coupling plate 34 of the upper jig 12. Clamp main bodies 50 described below are arranged at upper ends of the first coupling post 46 and the second coupling post 48. When the upper jig 12 that grips the front assembly 18 is coupled to the lower jig 14 and seen from above as in FIG. 3, the first coupling post 46 is positioned outside the front assembly 18, and the second coupling post 48 is positioned inside the front assembly 18 at a predetermined distance apart from the first coupling post 46.

The lower jig 14 is provided with the plurality of positioning pins 28 that can be inserted in the pin holes of the front assembly 18. Each positioning pin 28 includes a cylinder mechanism slidingly movable up and down. Each positioning pin 28 is supported slidably in a horizontal direction on the lower jig 14 to meet a position of each pin hole that differs depending on a type of the front assembly 18.

Figure 4:
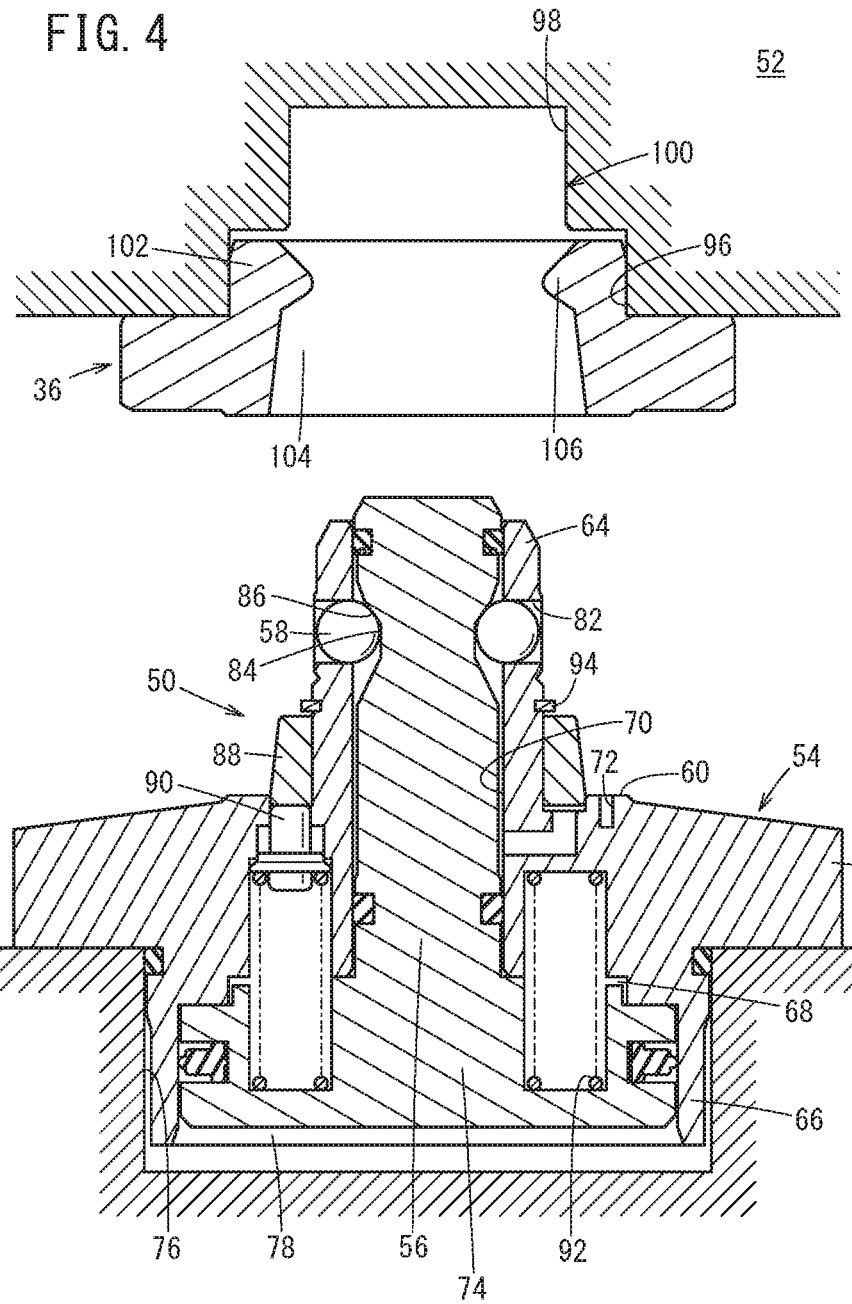
FIG. 4 is a view showing a state before a clamp main body and a guide block are coupled according to the embodiment of the present invention.
Figure 5:
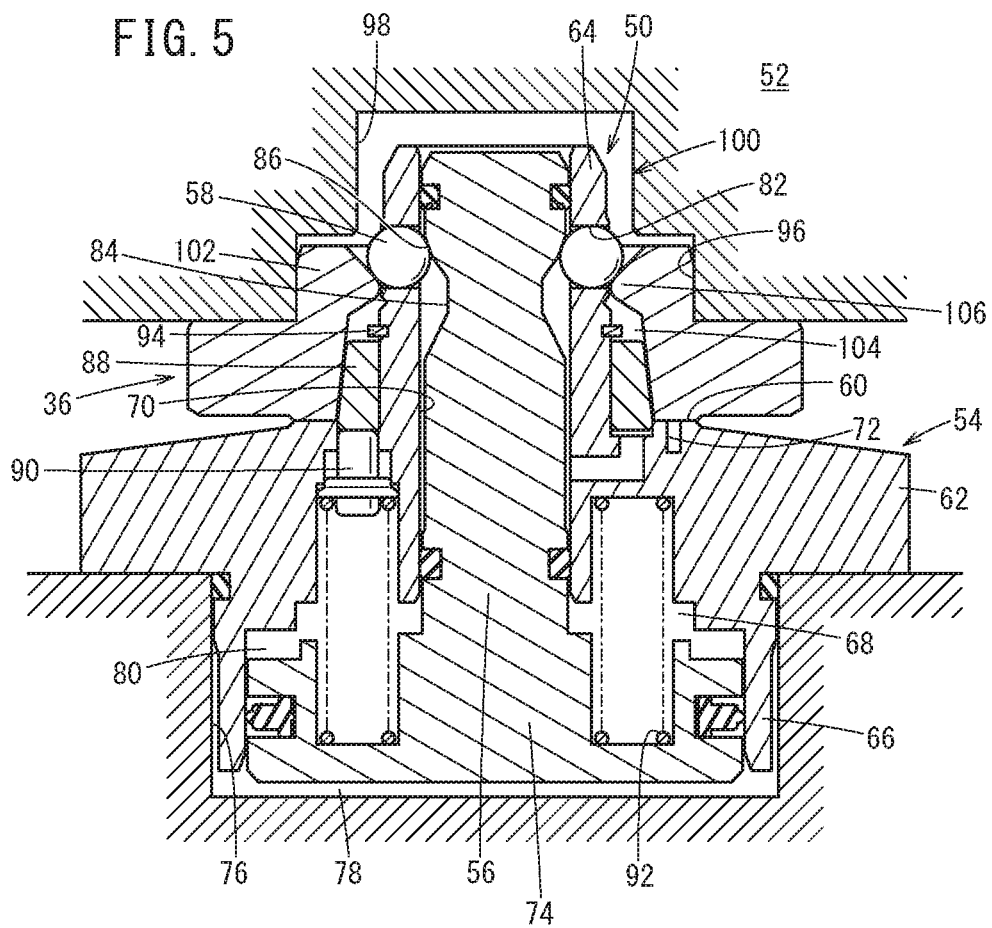
FIG. 5 is a view showing a state where the clamp main body and the guide block are coupled according to the embodiment of the present invention.

As shown in FIGS. 4 and 5, clamp devices (coupling units) 52 include clamp main bodies 50 made of metal and disposed at the first coupling post 46 and the second coupling post 48, and the guide blocks 36 made of metal and disposed at the first coupling plate 32 and the second coupling plate 34. The clamp main body 50 of the first coupling post 46 and the clamp main body 50 of the second coupling post 48 employ the same configuration. The guide block 36 of the first coupling plate 32 and the guide block 36 of the second coupling plate 34 employ the same configuration. For ease of description, a specific configuration where the clamp device 52 is arranged between the first coupling post 46 and the first coupling plate 32 will be described below. In this regard, a basic configuration of the clamp device 52 is known.

The clamp main body 50 includes a body 54, a piston rod 56, steel balls 58 and the like. The body 54 includes a base portion 62 having a seating surface 60 on which the guide block 36 seats, a columnar portion 64 that protrudes upward of the base portion 62, and a skirt portion 66 of a cylindrical shape that is formed on a lower side of the base portion 62. A piston rod insertion hole 70 is formed at the center of the body 54, and penetrates vertically with a cylinder chamber 68 of a larger diameter on the lower side. The seating surface 60 has an air vent hole 72 to be used for seat-checking. By monitoring an air pressure in an air passage that communicates with the air vent hole 72, it is possible to detect the seating of the guide blocks 36.

The piston rod 56 is slidably fitted to the piston rod insertion hole 70 of the body 54, and a piston portion 74 formed at a lower end of the piston rod 56 is arranged in the cylinder chamber 68. The skirt portion 66 is fitted and fixed to a circular recess 76 formed in an upper end of the first coupling post 46. A lower surface of the piston portion 74, the circular recess 76 and the skirt portion 66 define a first pressure chamber 78, and the base portion 62 and the piston rod 56 define a second pressure chamber 80. Compressed air is selectively fed to and discharged from the first pressure chamber 78 and the second pressure chamber 80 via unillustrated ports.

A plurality of steel ball accommodation holes 82 are formed near the upper end of the columnar portion 64 of the clamp main body 50 and communicate the piston rod insertion hole 70 and a lateral space of the columnar portion 64. Each steel ball 58 is accommodated in each steel ball accommodation hole 82. Each steel ball accommodation hole 82 is formed as a tapered surface whose diameter is slightly reduced toward a lateral side of the columnar portion 64, and a protrusion amount of the steel ball 58 from the lateral side of the columnar portion 64 is limited to a predetermined amount.

A reduced diameter recess 84 of an annular shape is formed in an outer circumference of the piston rod 56 near an upper end thereof and allows insertion of the predetermined amount of the steel balls 58. A portion close to an upper end of the reduced diameter recess 84 is a pressing surface 86 that can press the steel balls 58 toward the lateral side of the columnar portion 64. When the piston rod 56 moves downward to a position, each steel ball 58 is pressed by the pressing surface 86 and protrudes outwardly from a side surface of the columnar portion 64. When the piston rod 56 moves upward to a position, each steel ball 58 fits in the reduced diameter recess 84, and can retreat to a position at which each steel ball 58 does not protrude from the side surface of the columnar portion 64.

A tapered sleeve 88 is vertically slidably provided on an outer circumference of a lower end portion of the columnar portion 64 of the clamp main body 50. An outer circumferential surface of the tapered sleeve 88 is a conical surface whose diameter is expanded downward. A small rod 90 is accommodated in the base portion 62 of the body 54, and receives an elastic force of a spring 92 disposed between the small rod 90 and a back surface of the piston portion 74 and biases the tapered sleeve 88 upward. A stopper 94 is arranged at an outer circumference of the columnar portion 64 and restricts upward movement of the tapered sleeve 88.

A guide block attachment hole 100 formed in a lower surface of the first coupling plate 32 includes a large diameter hole portion 96 on the lower surface side and a small diameter hole portion 98 that continues from the large diameter hole portion 96 on the side opposite from the lower surface. The guide block 36 includes a fitting cylindrical portion 102 that protrudes upward. When the fitting cylindrical portion 102 fits to the large diameter hole portion 96, the guide block 36 is fixed to the first coupling plate 32. The small diameter hole portion 98 can accommodate the upper end portion of the columnar portion 64 of the clamp main body 50.

The guide block 36 has a columnar portion insertion hole 104 vertically penetrating therethrough. The columnar portion insertion hole 104 has an annular engagement portion 106 protruding inwardly to come into contact with the steel balls 58 near an upper end of the columnar portion insertion hole 104. The columnar portion insertion hole 104 has a conical surface capable of being in close contact with the outer circumferential surface of the tapered sleeve 88 from a lower end of the annular engagement portion 106 to a lower opening of the columnar portion insertion hole 104. An inner diameter of the lower opening of the columnar portion insertion hole 104 is larger than an outer diameter of the columnar portion 64 of the clamp main body 50. Even when the tapered sleeve 88 is closely in contact with the columnar portion insertion hole 104, the guide block 36 can turn around an axial line (uniaxially) of the columnar portion 64 with respect to the clamp main body 50.

The vehicle body assembling device 10 according to the present embodiment is basically configured as described above. A function and an effect of a vehicle assembling method that uses the vehicle body assembling device 10 will be described below.

The components such as the front side frames 20, the pair of front wheel houses 22, the front bulk head 24 and the dashboard 26 that form the front assembly 18 are temporarily assembled by engaging the recesses and the protrusions of the components and held at the unillustrated set station.

The temporarily assembled front assembly 18 is gripped by the upper jig 12 through the plurality of grip portions 30. Next, the conveying robot 16 is driven, and the upper jig 12 is conveyed from the set station to a position meeting the lower jig 14 while keeping a horizontal posture. In this case, the clamp main bodies 50 provided at the first coupling post 46 and the second coupling post 48 of the lower jig 14 are in a state where compressed air is supplied to the first pressure chamber 78, while being discharged from the second pressure chamber 80. That is, as shown in FIG. 4, the piston rod 56 has moved upward to a position, and each steel ball 58 faces toward the reduced diameter recess 84 of the columnar portion 64.

When conveyed to the position meeting the lower jig 14, the upper jig 12 is lowered toward the lower jig 14 by the conveying robot 16. The columnar portions 64 of the clamp main bodies 50 provided at the first coupling post 46 and the second coupling post 48 gradually enter the columnar portion insertion holes 104 of the guide blocks 36 provided at the first coupling plate 32 and the second coupling plate 34, respectively. At these coupling portions, the annular engagement portions 106 of the columnar portion insertion holes 104 move to be stowed under the steel balls 58 while pushing the steel balls 58 in the reduced diameter recesses 84 of the columnar portions 64, so that inner circumferential surfaces of the columnar portion insertion holes 104 are brought into close contact with the outer circumferential surfaces of the tapered sleeves 88. Further, when the tapered sleeves 88 are slightly pressed down against the elastic forces of the springs 92, the guide blocks 36 of the first coupling plate 32 and the second coupling plate 34 abut against the seating surfaces 60 of the clamp main bodies 50.

By the close contact between the inner circumferential surfaces of the columnar portion insertion holes 104 and the outer circumferential surfaces of the tapered sleeves 88, the guide blocks 36 are positioned in the front and rear and left and right directions with respect to the clamp main bodies 50. That is, the first coupling plate 32 of the upper jig 12 is positioned in the horizontal direction (XY directions) with respect to the first coupling post 46 of the lower jig 14. The second coupling plate 34 of the upper jig 12 is positioned in the horizontal direction (XY directions) with respect to the second coupling post 48 of the lower jig 14.

When seating of the guide blocks 36 to the seating surfaces 60 of the clamp main bodies 50 is detected, lowering of the upper jig 12 is stopped, the compressed air is discharged from the first pressure chambers 78 of the clamp main bodies 50, and fed to the second pressure chambers 80.

When the compressed air is discharged from the first pressure chambers 78 and the compressed air is fed to the second pressure chambers 80, the piston rods 56 is lowered, and the pressing surfaces 86 of the piston rods 56 press the steel balls 58 and make the steel balls 58 protrude from the side surfaces of the columnar portions 64 (see FIG. 5). Thus, the guide blocks 36 are sandwiched between the seating surfaces 60 of the clamp main bodies 50 and the steel balls 58, and the guide blocks 36 are vertically positioned with respect to the clamp main bodies 50. That is, the first coupling plate 32 of the upper jig 12 is positioned in a height direction (Z direction) with respect to the first coupling post 46 of the lower jig 14. The second coupling plate 34 of the upper jig 12 is positioned in the height direction (Z direction) with respect to the second coupling post 48 of the lower jig 14.

Subsequently, the plurality of positioning pins 28 of the lower jig 14 are slid upward by the cylinder mechanism and each positioning pin 28 is inserted in each pin hole of the front assembly 18. Thus, the front assembly 18 is supported so as not to deflect.

As described above, when seating of the guide block 36 to the seating surface 60 of the clamp main body 50 is detected at each coupling portion, the upper jig 12 stops lowering. The load applied from the upper jig 12 to the distal end arm 42 coupled to the upper jig 12 is detected at all times. Before the guide blocks 36 are seated, the load (W) corresponding to a total weight of the upper jig 12 and the front assembly 18 is detected. When the upper jig 12 stops lowering and then a load that is smaller than the load (W) by a predetermined value ($\Delta w$) is detected, the lower jig 12 is slightly lifted to make such adjustment that the load applied from the upper jig 12 to the lower jig 14 does not exceed the predetermined value ($\Delta w$). The degree of $\Delta w$ desirably has a value as close to zero as possible.

According to the present embodiment, since the weights of the upper jig 12 and the front assembly 18 transmitted to the lower jig 14 are reduced, the upper jig 12 and the lower jig 14 can be coupled at only two coupling portions. The strength required for the first coupling post 46 and the second coupling post 48 is reduced. Consequently, it is possible to simplify the components related to coupling of the upper jig 12 and the lower jig 14, make entry of the welding device easy and improve efficiency of the welding operation. In other words, a function that is necessary for the coupling portions of the upper jig 12 and the lower jig 14 only needs to position the upper jig 12 with respect to the lower jig 14. Support of the load does not need to be taken into account. Consequently, it is possible to simplify the components related to the coupling portions.

The lowering of the upper jig 12 is stopped in response to the detection of the contact between the guide blocks 36 and the seating surfaces 60 of the clamp main bodies 50. Consequently, in a state where the weights of the upper jig 12 and the front assembly 18 are reduced, it is possible to easily realize control of the coupling between the upper jig 12 and the lower jig 14.

The load applied to the distal end arm 42 of the conveying robot 16 from the upper jig 12 is detected. Therefore, it is possible to adjust to a desired value the load applied from the upper jig 12 to the lower jig 14 when the upper jig 12 is coupled to the lower jig 14.

A combination of the columnar portion insertion holes 104 whose diameters are expanded downward and the slidable tapered sleeves 88 position the guide blocks 36 in the front and rear and the left and right directions with respect to the clamp main bodies 50. Consequently, it is easy to perform position adjustment for lowering the upper jig 12 toward the lower jig 14.

In the present embodiment, the first coupling plate 32 is directly attached to the base portion 29 of the upper jig 12 yet may be attached to the base portion 29 via a support post, as in the second coupling plate 34. The upper jig 12 and the lower jig 14 are coupled via two portions yet may be coupled via three or more portions when necessary. Upon detection of the seating of the guide blocks 36, lowering of the upper jig 12 is stopped. Meanwhile, the load applied to the distal end arm 42 from the upper jig 12 is detected to adjust the load applied from the upper jig 12 to the lower jig 14. However, these controls may not be used in combination.

The vehicle body assembling device (method) according to the present invention is not limited to the above embodiment, and can employ various configurations without departing from the scope of the present invention.

What is claim is:

1. A vehicle body assembling method for supporting vehicle body components in advance in an assembled state using an upper jig and a lower jig coupled to each other, the vehicle body assembling method comprising:

conveying the upper jig by a conveying means in a state where the upper jig supports the vehicle body components; and coupling the upper jig to the lower jig at a first portion and at least a second portion in a state where a load applied from the upper jig to the lower jig is reduced based on a variable distance between the upper jig and the lower jig while facilitating uniaxial rotation of a first guide block at a first fixed location of the first portion and at least a second guide block at a second fixed location of at least the second portion.

2. The vehicle body assembling method according to claim 1, further comprising detecting seating of the upper jig to the lower jig.

3. The vehicle body assembling method according to claim 1, further comprising detecting an amount of a load applied to the conveying unit from the upper jig.

4. The vehicle body assembling method according to claim 1, wherein coupling portions between the upper jig and the lower jig are two portions positioned inside and outside the vehicle body components seen from above.

5. A vehicle body assembling device comprising a jig configured to support vehicle body components in advance in an assembled state, wherein:

the jig includes an upper jig and a lower jig coupled to each other via at least two portions;

a coupling unit is provided at each of the at least two portions of coupling, such that uniaxial rotation of a portion of the coupling unit is provided and a position between the coupling unit and each of the at least two portions of coupling is fixed; and the vehicle body assembling device comprises a conveying unit configured to convey the upper jig supporting the vehicle body components, and reduce a load applied from the upper jig to the lower jig when the upper jig is coupled to the lower jig based on changing a distance between the upper jig and the lower jig in response to the load.

6. The vehicle body assembling device according to claim 5, further comprising a unit configured to detect seating of the upper jig to the lower jig.

7. The vehicle body assembling device according to claim 5, further comprising a unit configured to detect an amount of a load applied to the conveying unit from the upper jig.

8. The vehicle body assembling device according to claim 5, wherein coupling portions between the upper jig and the lower jig are two portions positioned inside and outside the vehicle body components seen from above.

* * * * *